Jan. 1, 1946. G. A. HARRINGTON 2,391,897
SOUND CONTROLLED RECORDER AND REPRODUCER
Filed March 22, 1944. 7 Sheets-Sheet 1

FIG. 1

Inventor
GERARD A. HARRINGTON.
By Howard J. Whelan
Attorney

FIG. 2.

Inventor
GERARD A. HARRINGTON.
By Howard J. Whelan.
Attorney

Inventor
GERARD A. HARRINGTON.
By Howard J. Whelan.
Attorney

Jan. 1, 1946.   G. A. HARRINGTON   2,391,897
SOUND CONTROLLED RECORDER AND REPRODUCER
Filed March 22, 1944    7 Sheets-Sheet 4

Inventor
GERARD A. HARRINGTON.

By Howard J. Whelan.
Attorney

Inventor
GERARD A. HARRINGTON.
By Howard J. Whelan.
Attorney

FIG. 13.

Jan. 1, 1946.　　　　G. A. HARRINGTON　　　　2,391,897
SOUND CONTROLLED RECORDER AND REPRODUCER
Filed March 22, 1944　　　7 Sheets-Sheet 6

Inventor
GERARD A. HARRINGTON.
By Howard J. Whelan.
Attorney

Jan. 1, 1946.  G. A. HARRINGTON  2,391,897
SOUND CONTROLLED RECORDER AND REPRODUCER
Filed March 22, 1944  7 Sheets-Sheet 7

FIG.11.

Inventor
GERARD A. HARRINGTON.

By Howard J. Whelan.
Attorney

Patented Jan. 1, 1946

2,391,897

UNITED STATES PATENT OFFICE 2,391,897

SOUND CONTROLLED RECORDER AND REPRODUCER

Gerard A. Harrington, Baltimore, Md.

Application March 22, 1944, Serial No. 527,561

11 Claims. (Cl. 179—100.4)

This invention relates to phonographic recording and reproducing devices and more particularly to those adapted for recording and reproducing sounds such as dictation and the like, on a flexible cylindrical recording shell adapted to be recordably impressed by the needle point or stylus. It has among its objects to provide a device so constructed and arranged that the recording and reproducing mechanism may be located at a distance from the dictator's position while under his complete remote control. It also has among its objects to provide arrangements in the device that may be easily and quickly shifted from recording to reproducing position or vice versa by remote control. A further object of this invention is to provide an apparatus with back spacing or repeat mechanism. Another object of this invention is to provide the apparatus with feed screw mechanism that can be engaged electrically. A further object is to provide a plurality of styli in conjunction with the recording shell, that may be alternately or consecutively operated for recording or reproduction. Another object of the device is to use an inconspicuous and concealed stylus and reproducing mechanism. A further object is to provide a mechanism of the expanding arbor type for holding and rotating the flexible recording cylinders. Another object of the device is to provide and attach a correction arrangement operable from a remote point which will make suitable notations and marks on correction cards through the employment of electrical charges. A still further object is to provide a thin light impressionable cylinder with the dictation impressed thereon which can be transportated freely without danger of breakage, and avoid the scraping and shaving process conventionally employed for the renewal of the recording surface. In such case the material employed is preferably of a thermoplastic nature that can be heated and ironed smooth with practically no loss of material, to impair or decrease its further use. Still another object of the device is to provide an integral ironing device for use in connection with the recording and reproducing mechanism that will remove the dictation from the cylinder face. A further object of the apparatus is to provide a device which will record a telephone conversation without disturbing or mechanically connecting to the wiring in a telephone circuit. An additional object of the apparatus is to include the various improvements of this invention and at the same time improve the structural appearance and convenience of the equipment. A still further object of the invention is to include in this device the means for enabling the recording to start operating automatically as soon as it is talked into, without requiring manual operation of the switches therefor, and at the same time delay the recording of the speech until the stylus and cylinder attain the proper operating cycle for properly transcribing the dictation, this is accomplished by providing a time delay between the starting of the device and that required to bring it up to proper speed. When the dictator stops talking, the transcribing cylinder continues to receive the message for a period equal to the starting delay. It is also intended as one of the objects to provide an apparatus which may be operated and dictated to remotely from several points. A further object of the apparatus is to provide means for returning the recording and reproducing parts of the device at high speed.

Other objects will become apparent as the invention is more fully set forth.

The characteristics of conventional phonographic recordings using cylinders for commercial purposes are well known and outlined in the catalogs of the concerns that manufacture them. They are not deemed to require detailed explanation in this application. However the existing equipment in this line, do not provide the features emphasized in this invention. This invention provides an automatic system for starting the device, when the user begins to dictate. All the speech for recording is transmitted even though a time interval is required, between the time the talking is started and the attainment of speed of the cylinder shell appropriate for the recording. Allowance is made for the inertia of the device. The recording shell used avoids the shaving, universally required for use in the commercial make of device. It is made of material that is relatively non-breakable and susceptible for use on expanding mandrels. Gravity is avoided as a pressure element for pressing the stylus against the face of the cylinder for recording the message, by employment of a more positive spring or magnetic tension device operating at any angle on the cylinder.

In the drawings which illustrate a form of this invention.

Similar reference characters refer to similar parts throughout the drawings.

In the construction shown in the drawings, 15 represents a cabinet in which the phonographic recording and reproducing mechanisms are installed. The structure of the cabinet is compact and designed to produce practical features in the equipment to facilitate its use, functions and operation. It is recessed at 16 to allow the platen 41 for a recording cylinder 17 used in this form of invention to fit below the plane level 18 where the enscribing surface 115 will be out of the way, visually and physically. The end of the recess 16 is closed by a hinged door 19 attached to the end wall 116 of the cabinet. The cover 20 of the cabinet is preferably hinged to open upwardly, and in closing to rest over the operable parts of the device in the cabinet. The cabinet is provided with a glass window 21 through which a correction card 22 and marking device 23 can be seen. The correction device is electrically operated and its markings 24 on the removable card 22 convey the necessary notes and instructions intended for the transcribing individual. The wall 116 of the cabinet is provided with a slot guide 25 through which the carbon-impregnated card 22 is inserted into a frame 26. The interior of the cabinet has a compartment 27 for housing the electronic amplifying equipment 28 and another compartment 29 for housing the motor and other incidental apparatus. The cabinet is provided with a base 30 removably attached to permit access to these compartments and support the amplifying unit. The side wall 31 of the recess 16 is slotted at 32 to allow the recording and reproducing heads 33 and 34 respectively to project into the recess space from the main compartment of the casing. The side wall 35 is provided with openings 36 through which brackets 37 that support the ironing roller 38 extend. The ironing roller is raised and lowered by a lever 39 attached to shaft 160 and pivoted to the cabinet and projects through a hole 40 in the wall 35. The cylinder 17 is supported on a flexible sleeve 41 which is expanded or contracted concentrically by expanding the mandrel 42. The latter is provided with slots 43 cut radially and arranged so the mandrel will tend to expand when the wedging collars 44 and 45 are brought together through the action of the right and left hand threads 46 when rotated by knob 47. The collar 44 is provided with a lateral circular shoulder 48 held to the shaft 49 by a set screw 50. After the cylinder or shell is mounted on the mandrel, the latter is expanded laterally by turning screw threads 46 and tightens against the internal surface of the recording cylinder 17 to prevent same from slipping rotatively and longitudinally while recording and reproducing. The cylinder is made of plastic (such as Tenite or an acetate in sheeting or molded form), that can be ironed out to a smooth surface when a suitably heated ironing device is impressed thereon. This ironing out is for the purpose of smoothing out the transcribed grooves made by the stylus when recording the speech conveyed from its recording head, 33. The recording stylus needle creates the impression in the surface of the plastic 17 and leaves recording grooves 51 therein until the operator removes them with the ironer. The ironer consists of a metal roller 38 supported on brackets 37 which swings to a position, where it contacts the cylinder. The brackets 37 are journalled to the cabinet by support 52. The roll 38 is heated by an internal electrical heating coil 53. This mechanism is preferably operated manually. The ironer is operated and rotated as the cylinder is rotated with the mandrel. The rolling of the surfaces of the heated roll, and the face of the cylinder against each other softens up the recorded impressions and removes them by melting and pressing them away to a smooth surface, leaving the cylinder ready for further recordings. The ironing eliminates any necessity for surface shaving of the cylinder, and is much speedier in action and less costly than other methods. It will be noticed that the cylinder has a relatively thin wall that gives it flexibility and lightness; when placed on the mandrel it is below the plane surface 18 of the cabinet. Likewise the ironer is out of the way when moved out of operation. The recording stylus head 33 and the reproducing head 34 are operated independently of each other, so that when one is in contact with the cylinder surface the other is not, as indicated through the use of a double throw switch having a neutral position to disconnect same completely when not required. They are however mounted together on a common carriage holder 54 and hung loosely on hinges 55 with delicate springs 56 and 57 respectively suspending them away from the cylinder surface when not in operating position. They are placed close to the external surface of the cylinder, but out of contact with same. When the recording stylus 33 is to be placed against the cylinder, its electromagnet 58 is energized by its circuit 126 and 150 and attracts the armature 170 mounted on the recording head. The magnetic pulling on the armature induces the recording head to bend down and overcome the tension of the spring 56 and make its stylus contact the cylinder surface and through its circuits 172 and 173 to scribe its recording thereon. When it is desired to use the reproducing head 34 for playing-back the recorded message, its electromagnet 59 is energized by its circuits 125 and 150 and attracts the armature 171 mounted on the reproducing head, causing same to bend down and overcome the tension of the spring 57. This makes the reproducer stylus contact the surface of the cylinder and through its circuits 172 and 174 play from said surface the message contained thereon. The supporting head holder 54 is slidably mounted on a bar 60 which is attached to the walls of the cabinet on supports 61 held by screws 62. The bar 60 is of insulating material and mounts a common bus bar 150 for conducting current to the common lead of both heads. The bus bars 120 and 125 are connected to the heads for conducting electrical energy to the recording head 33 and reproducing head 34 respectively. The head holder 54 also supports electromagnetic devices 66 and 67 which draw the pending arm 68 to make contact with the feed screw 69 and return screw 70 alternately. The screw 69 moves recording and reproducing heads across the face of the cylinder to record or reproduce the notations therefrom. The return screw 70 is used to quickly return the heads to their starting position. Springs 71 keep the arm 68 neutral and out of contact with the lead screws when the electromagnets 66 and 67 are not energized. The holder 54 is provided with a shelf 72 to support electromagnets 73 and 74 for moving the marking device 23 over a card 22 and placing the markings 24 thereon. The card is supported on a shelf 26 which is provided with an electrical contact 75. The platen 41 and cylinder 17 are operated by a motor 76 attached to the bearing 176 on the side wall and is cushioned by part 77 to prevent motor noises from being recorded on the cylinder. The platen is started and stopped by clutch 78 which is operated by electromagnet 79, arm 80. When the clutch is disengaged the slidable portion of the clutch contacts brake 81 which stops the platen from rotating. The feed screw 69 and return screw 70 are supported in bracket 170 attached to wall 116 and are alternately operated from the drive shaft by gears 82 and 83 respectively. The amplifying unit 28 is equipped with a switching microphone 84, loudspeaker 85, and volume control 86. An attachment unit 87 for picking up both sides of a telephone conversation for recording on the cylinder is also attached to the amplifying unit 28.

In the operation of the device the main manual switch 90 is closed and through its circuits 175 and 176 provides electric current to operate the various apparatus connected with this device including the amplifier 28 through the circuits connected therewith. Switch 92 is then closed and starts motor 76, which in turn operates the feed and return screws 69 and 70 respectively. The screws move the carriage holder 54 in the slot 32 in the recess wall. Switch 93 is then closed and its circuits 117 and 134 operates electromagnet 79, which attracts the arm 80 and moves the clutch 78 causing the platen with the cylinder 17 to rotate. When the clutch 78 is disengaged it contacts brake 31 which stops the platen. The switch 94 is then closed and its circuits 128 and 140 cause the energizing of the microphone 84. The switch 95 controls the circuits 119 and 151 to the electromagnet 66 which causes pending arm 68 to threadably contact the feed screw 69 and move the carriage holder 54 in the slot 32 for transcribing. The switch 96 is then closed and through circuits 120 and 151 operates the electromagnet 58 which in turn induces the recording head 33 with its stylus to press against the cylinder 17 and create various markings 51 thereon. When it is desired to show a point at which a correction is to be made in the dictation on the face of the cylinder or where the end of the letter has been reached, the switch 97 is closed by the operator and energizes the carbon-impregnated card 22 through contact 75 and needle 23 through the circuits 121 and 152 to make a distinguishing mark on the card. Switch 98 is closed and through the circuits 122 and 154 to the electromagnet 73 causes the needle 23 to vibrate and hit the paper and arc dottedly as it moves a short distance. When the switch 99 is closed at the end of the letter and its circuits 123 and 154 causes the electromagnet 74 to move the needle 23 a greater travel and thus mark the card by passing an electric current through it in the same manner. Each cylinder is preferably provided with a separate card for corrections to be noted by the transcriber. To return the carriage to its starting point, switches 95, 96, 98 and 99 are opened. Switch 100 is then closed energizing through circuits 124 and 151 the electromagnet 67 and brings the arm 68 into contact with the screw 70 which in its rotation returns the carriage 54 to its normal starting place in the slot 32, the switch 100 is opened at this point. Switch 95 is closed bringing the arm 68 into relation with the feed screw 69 and moves the reproducing head in the slot 32. Switch 101 is closed and through its circuit 127 energizes the loud speaker 85. Switch 102 is closed and through its circuits 125 and 150 closes the electromagnet 59 which causes the reproducing head 34 and its point 178 to contact the face of the cylinder and play back the dictation transcribed thereon over circuits 172 and 174. When it is desired to record a telephone conversation without physically or mechanically disturbing the telephone connections a unit 87 is placed against the conventional telephone ear piece 103 and held in position by spring clamps 104. The unit 87 houses a microphone 180 in its case 181 and is provided with passages 182 to allow the person to hear the incoming message at the same time it is passing through passages 183 to the microphone 180 and transferred over circuit 126 to the cylinder 17. Holes 105 in the walls of the unit allow a conversation being sent over the telephone to be recorded also. Switch 106 connects the microphone attachment unit to the recording device. Switch 107 connects the heating element 53 in the ironer 38 as it is moved towards the face of the cylinder 17 by lever 39. The volume control 86 through its circuit 128 regulates the amount of power for recording or reproducing the dictation.

Figure 1:
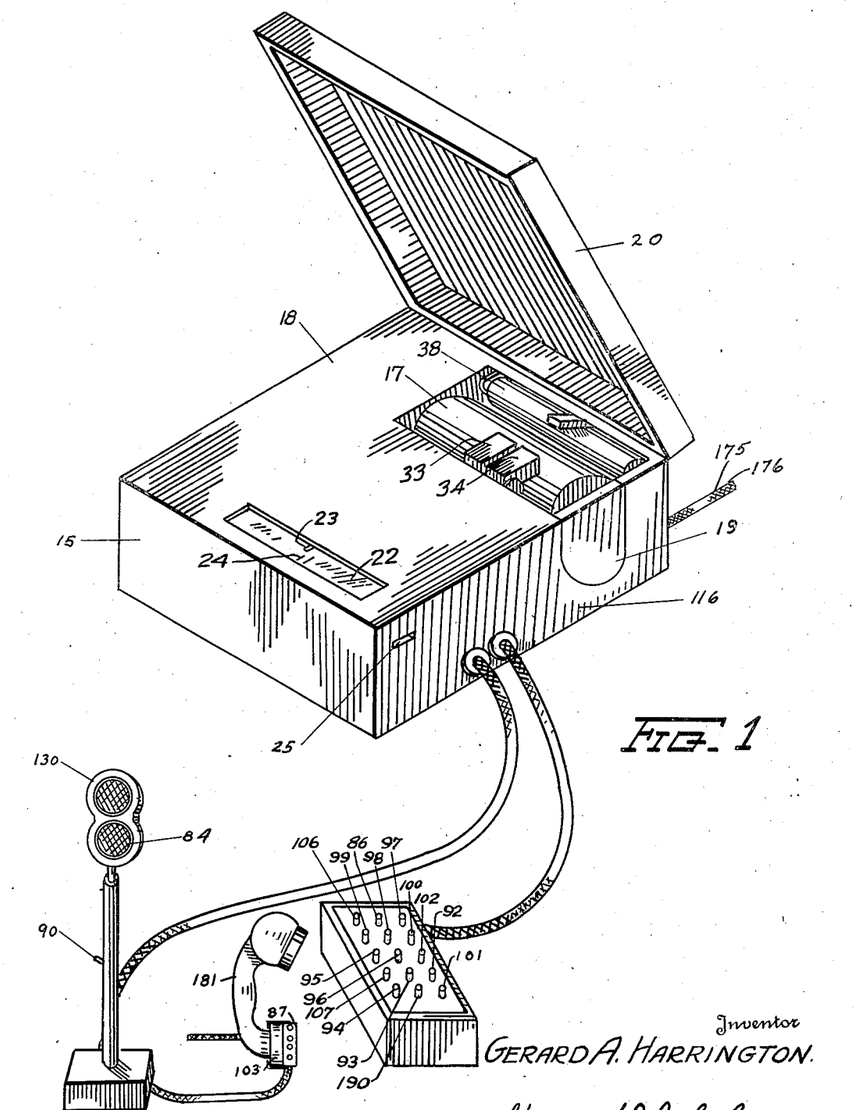
Figure 1 is a side elevation in perspective of a recording and reproducing device embodying the invention indicated herein.
Figure 2:
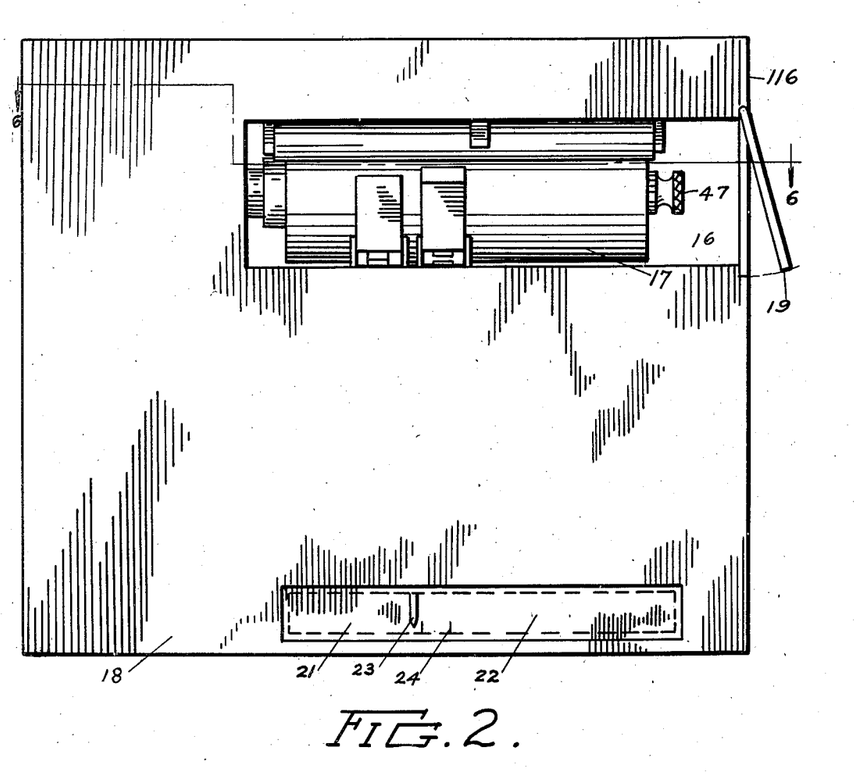
Figure 2 is a plan view of the device with the cover removed.
Figure 3:
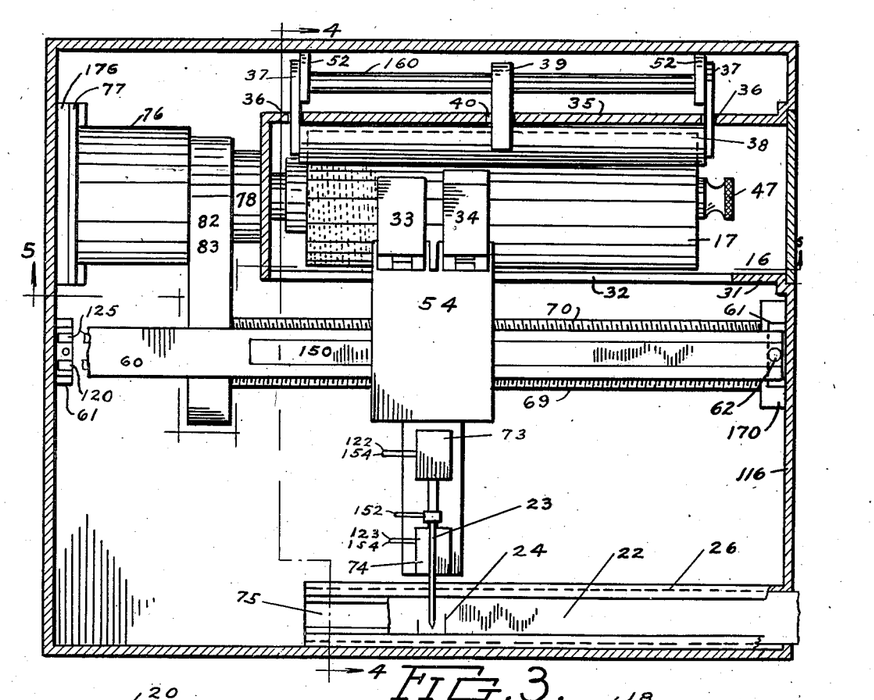
Figure 3 is a sectional plan view looking into the mechanism taken along line 3—3 of Figure 4.
Figure 4:
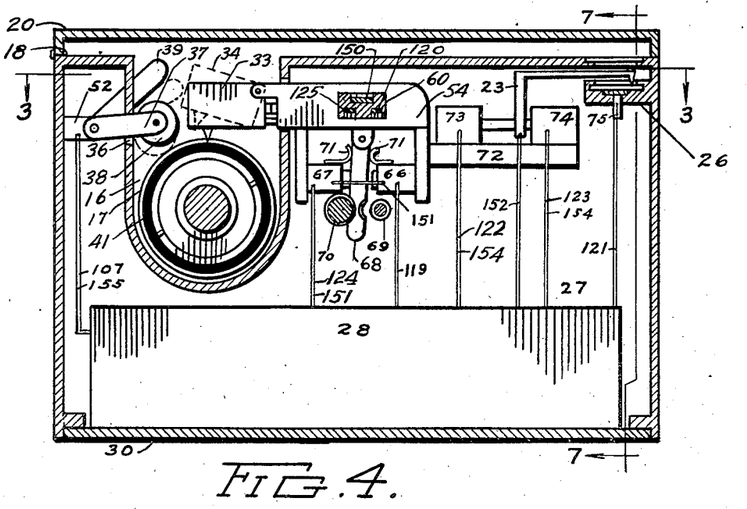
Figure 4 is a section view taken along line 4—4 of Figure 3.
Figure 5:
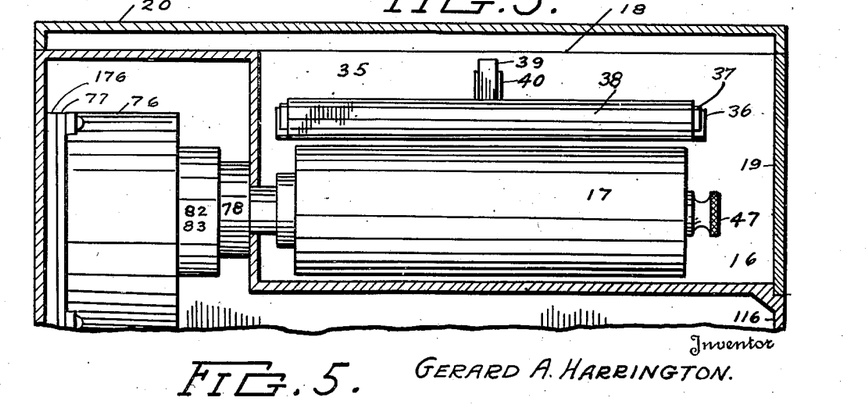
Figure 5 is a sectional view taken along line 5—5 of Figure 3.
Figure 6:
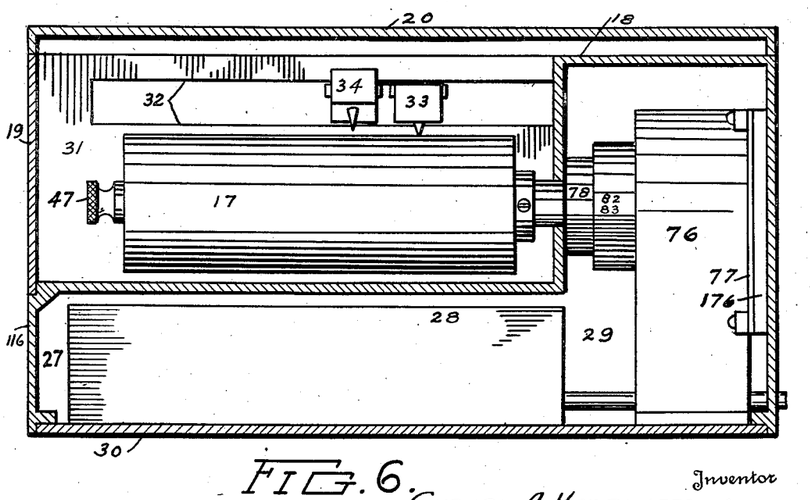
Figure 6 is a sectional view taken along line 6—6 of Figure 2.
Figure 7:
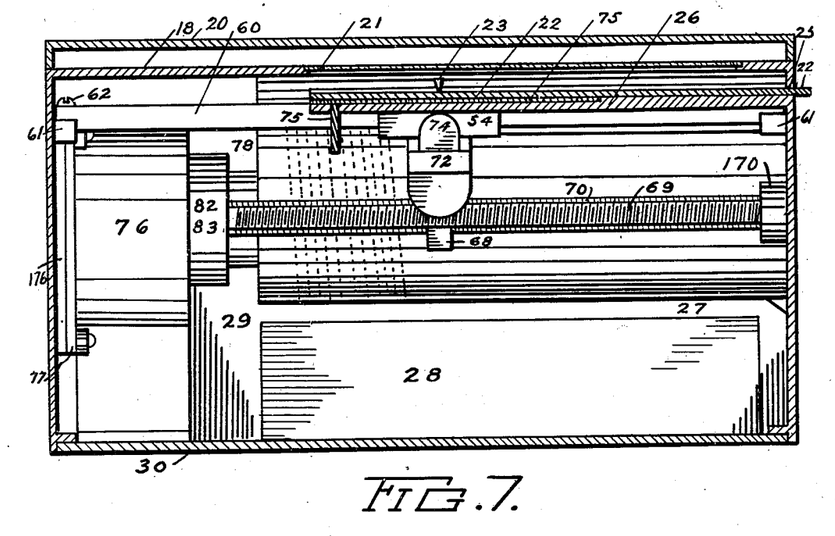
Figure 7 is a sectional view taken along line 7—7 of Figure 4.
Figure 8:
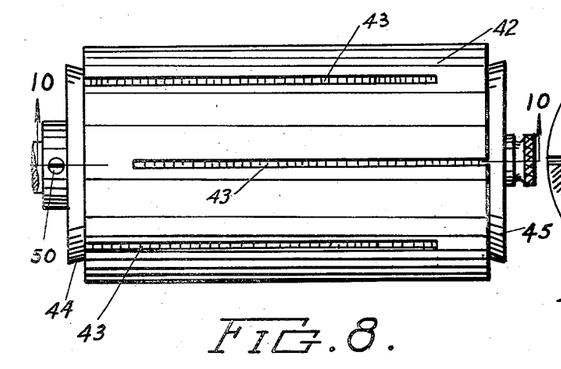
Figure 8 is a side elevation of the expanding mandrel, with the expanding cover and cylinder removed.
Figure 9:
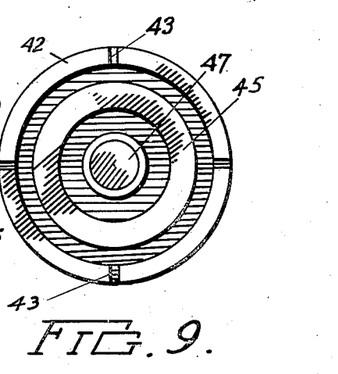
Figure 9 is an end view of Figure 8.
Figure 10:
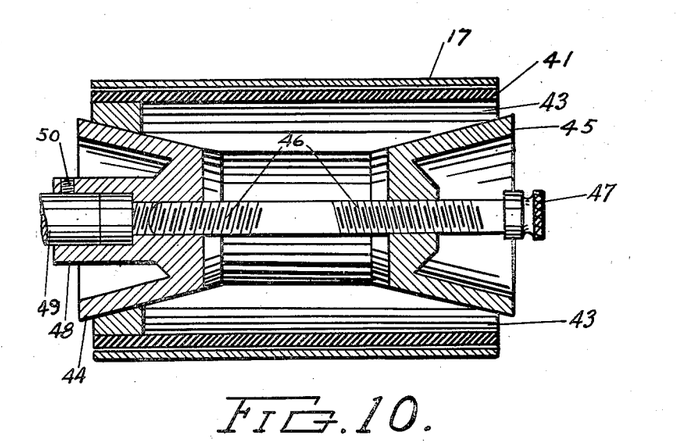
Figure 10 is a sectional elevation taken along line 10—10 of Figure 8, with the expanding cover and cylinder in section.
Figure 11:
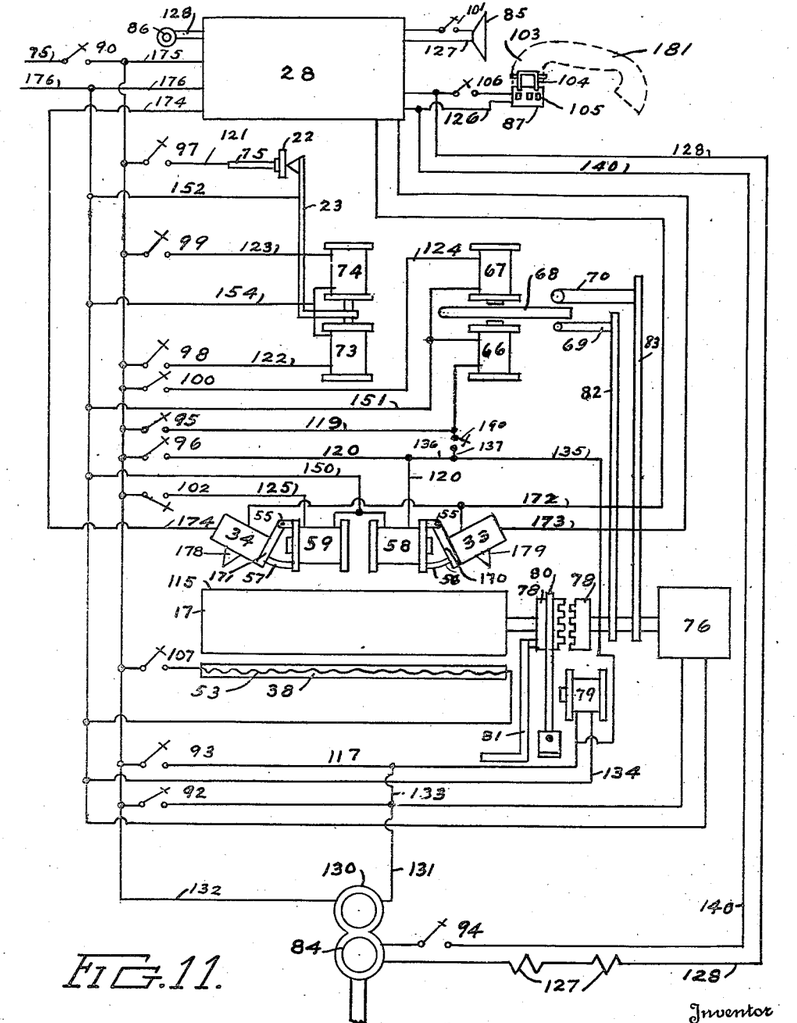
Figure 11 is a diagrammatic wiring diagram.
Figures 12, 14, 15:
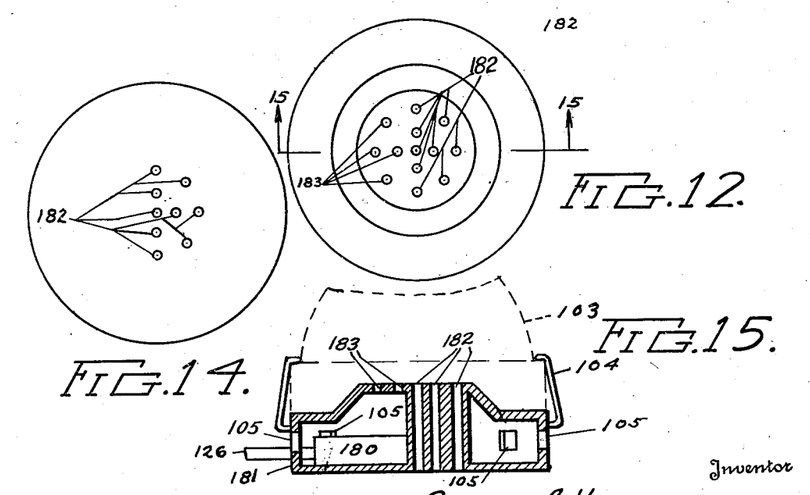
Figure 12 is a plan view of the telephone attachment.
Figure 14 is a view of the under side which is placed against the ear of the user.
Figure 15 is a sectional view taken along line 15—15 of Figure 12.
Figure 13:
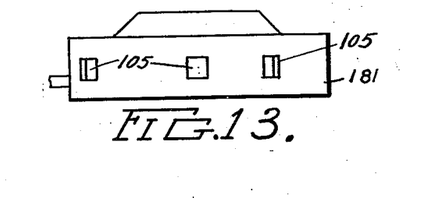
Figure 13 is a side elevation of Figure 12.

The recording and reproducing heads work in a conventional manner in making impressions on the cylinder and transmitting the reproduction of same. In order to start the device by the sound of the dictator's voice, and have it stop when he stops talking, there is provided a method of entrapping the words spoken until the equipment has attained its proper speed and is in operable condition to record the message. When this phase of the cycle is reached the words are impressed on the face of the cylinder and continue to be so recorded after the speaker stops talking until the full message is recorded. This is accomplished preferably by inserting induction coils 127 in the circuit 128 which connects the switching microphone 84 to the amplifier unit 28 to delay the transmission of the voice to the recording stylus and its operable parts. The other side of the circuit is numbered 140. When the dictator produces the first of a series of words to be recorded, it actuates a sound switch 130 and closes the circuits 131, 132, 133, 134, 135, 136 and 137 and switch 190. The closing of these circuits starts the motor 76, closes the clutch 78 and rotates the cylinder 17, closes the electromagnet 66 which brings the arm 68 into contact with feed screw 69 moving the carriage 54 in slot 32 and pulls the recorder stylus into recording position on the face of the cylinder 17, ready to receive the message. The voice of the dictator is also picked up at the same time by the switching microphone 84 and passed on to the induction coils 127 where it is delayed and passed on over circuits 128 and 140 to the recording device where the message is impressed on the face of the cylinder. The sound switch 130 is provided with a dash-pot to delay the opening of the circuits 131 and 132 and disconnecting the motor and other circuit as soon as the dictator stops talking. This delay action allows the cylinder to rotate long enough to receive the full message before its power is turned off. Any interruption in the operators speaking for a period of time longer than that allowed by the setting of the dash-pot at that time, will cause the sound switch to open the motor and other circuits above mentioned and stop the motor and other apparatus.

The process of starting the recording is repeated in the same manner when again required. In the meantime all circuits are disconnected, and waste of energy avoided. The reversal of the process to produce the reproduction is done through manual operation of the switches concerned.

While but one general form of the invention is shown in the drawings and described in the specifications, it is not desired to limit this application for patent to this particular form or in any other way otherwise than limited by the scope thereof, as it is appreciated that other forms of construction could be made that would use the same principles and come within the scope of the appended claims.

Having thus described the invention, what is claimed is:

1. A device of the class described comprising in combination, a cabinet, a recording and reproducing phonographic mechanism in the cabinet, a recording cylinder rotatable in the cabinet cooperating with said mechanism for transcribing and reproducing recordings sonorifically, means for operating the said mechanisms and cylinder, means operable by sound waves for inducing the last mentioned means to start operating, and an ironing mechanism for renewing the surface of the cylinder for additional recordings attached to the cabinet and arranged for connecting and disconnecting contact with the cylinder.

2. A device of the class described comprising in combination, a cabinet, a mechanical electrical recording and reproducing phonographic mechanism in the cabinet, a thermoplastic recording cylinder rotatable in the cabinet cooperating with said mechanism, for transcribing and reproducing recordings sonorifically, motive means for operating the said mechanisms and cylinder, mechanical means operable by sound waves for inducing the last mentioned means to start operating an ironing mechanism for renewing the surface of the cylinder for additional recordings, and a heater for heating the ironing mechanism to facilitate the renewal of the cylinder surface thereby, connected with said last mentioned mechanism.

3. A device of the class described comprising in combination, a cabinet, a mechanical electrical recording and reproducing phonographic mechanism in the cabinet, a thermoplastic recording cylinder rotatable in the cabinet cooperating with said mechanism for transcribing and reproducing recordings sonorifically, motive means for operating said mechanisms and cylinder, mechanical means operable by sound waves for inducing the last mentioned means to start operating, a heater for heating the ironing mechanism to facilitate the renewal of the cylinder surface thereby, connected with said last mentioned mechanism, partitions and walls in the cabinet for supporting and enclosing the cylinder, means and mechanisms aforesaid, and keeping same within predetermined limits therein, and remote control for operating the said means and mechanisms.

4. A device of the class described comprising in combination, a cabinet, a mechanical electrical recording and reproducing phonographic mechanism in the cabinet, a thermoplastic recording cylinder rotatable in the cabinet cooperating with said mechanism for transcribing and reproducing recordings sonorifically, motive means for operating said mechanisms and cylinder, mechanical means operable by sound waves for inducing the last mentioned means to start operating, an ironing mechanism connected with the said recording cylinder and adapted to be brought into pressure contact therewith, a heater for heating the ironing mechanism to facilitate the renewal of the cylinder surface thereby, connected with said last mentioned mechanism, partitions and walls in the cabinet for supporting and enclosing the cylinder, means and mechanisms aforesaid, and keeping same within predetermined limits therein, electrical remote control for operating the said means and mechanisms, and electrical circuits and switches for connecting the mechanisms and means for operating same in predetermined sequence.

5. A device of the class described comprising in combination, a cabinet, a mechanical electrical recording and reproducing phonographic mechanism in the cabinet, a thermoplastic recording cylinder rotatable in the cabinet cooperating with said mechanism for transcribing and reproducing recordings sonorifically, motive means for operating said mechanisms and cylinder, mechanical means operable by sound waves for inducing the last mentioned means to start operating, an ironing mechanism connected with the said recording cylinder and adapted to be brought into pressure contact therewith, a heater for heating the ironing mechanism to facilitate the renewal of the cylinder surface thereby, connected with said last mentioned mechanism, partitions and walls in the cabinet for supporting and enclosing the cylinder, means and mechanisms aforesaid, and keeping same within predetermined limits therein, electrical remote control for operating the said means and mechanisms, and electrical circuits and switches for connecting the mechanisms and means for operating same in predetermined sequence, and arm elements and feed and return screws operably mounted in the cabinet and connected with the recording and reproducing mechanism for carrying the latter back and forth over the said cylinder.

6. A device of the class described comprising in combination, a cabinet, a mechanical electrical recording and reproducing phonographic mechanism in the cabinet, a thermoplastic recording cylinder rotatable in the cabinet cooperating with said mechanism for transcribing and reproducing recordings sonorifically, motive means for operating said mechanisms and cylinder, mechanical means operable by sound waves for inducing the last mentioned means to start operating, an ironing mechanism connected with the said recording cylinder and adapted to be brought into pressure contact therewith, a heater for heating the ironing mechanism to facilitate the renewal of the cylinder surface thereby, connected with said last mentioned mechanism, partitions and walls in the cabinet for supporting and enclosing the cylinder, means and mechanisms aforesaid, and keeping same within predetermined limits therein, electrical remote control for operating the said means and mechanisms, and electrical circuits and switches for connecting the mechanisms and means for operating same in predetermined sequence, and arm elements and feed and return screws operably mounted in the cabinet and connected with the recording and reproducing mechanism for carrying the latter back and forth over the said cylinder, and means connected with the recording and reproducing mechanisms for plural attachment to external devices producing audible signals for recording or reproduction.

7. In combination with a dictaphonic machine, a plastic recording means mounted within the machine and adapted to travel predeterminedly to receive and transmit verbiage dictated thereto, a carrier for said means actuated within the machine, and an ironing device moveably attached to the machine for impressing the said means and renewing the surface of the cylinder without removing material therefrom for additional recordings.

8. In combination with a dictaphonic machine, a plastic recording means mounted within the machine and adapted to travel predeterminedly to receive and transmit verbiage dictated thereto, a carrier for said means actuated within the machine, a heated ironing device movably attached to the machine for impressing the said means and renewing the surface of the cylinder for the reception of additional recordings, and a sound operated arrangement for automatically operating the means when the user starts dictating thereto.

9. In combination with a dictaphonic machine, a plastic recording means mounted within the machine and adapted to travel predeterminedly to receive and transmit verbiage dictated thereto, a carrier for said means actuated within the machine, a heated ironing device moveably attached to the machine for impressing the said means and renewing the surface of the cylinder for the reception of additional recordings, and a sound operated arrangement for automatically operating the means when the user starts dictating thereto, remote control for controlling the operation of the said means, and means for conveying sounds for recording from various locations separate from each other.

10. In combination with a dictaphonic machine, a plastic recording means mounted within the machine and adapted to travel predeterminedly to receive and transmit verbiage dictated thereto, a carrier for said means actuated within the machine, a heated ironing device moveably attached to the machine for impressing the said means and renewing the surface of the cylinder for the reception of additional recordings, and a sound operated arrangement for automatically operating the means when the user starts dictating thereto, remote control for controlling the operation of the said means, and means for conveying sounds for recording from various locations separate from each other, and a plurality of electrical circuits, switches, magnetic devices and mechanisms for operating the parts of the said machine in predetermined sequence operable by said control.

11. In combination with a dictaphonic machine, a plastic recording means mounted within the machine and adapted to travel predeterminedly to receive and transmit verbiage dictated thereto, a carrier for said means actuated within the machine, a heated ironing device moveably attached to the machine for impressing the said means and renewing the surface of the cylinder for the reception of additional recordings, and a sound operated arrangement for automatically operating the means when the user starts dictating thereto, remote control for controlling the operation of the said means and means for conveying sounds for recording from various locations separate from each other, and a plurality of electrical circuits, switches, magnetic devices and mechanisms for operating the parts of the said machine in predetermined sequence operably by said control, and a correction means for electrically noting changes to be made on the recording means by a transcriber listening to the recordings of the machine.

GERARD A. HARRINGTON.